United States Patent Office 3,332,980
Patented July 25, 1967

3,332,980
ARYL POLYALKYLENEOXY CARBONATES
Robert E. Leary, Westfield, and Leslie M. Schenck, Mountainside, N.J., assignors to General Aniline & Film Corporation, New York, N.Y., a corporation of Delaware
No Drawing. Filed Apr. 3, 1964, Ser. No. 357,276
6 Claims. (Cl. 260—463)

This invention relates to a new and useful class of organic polyalkyleneoxy carbonates having surface active properties and many valuable industrial applications.

We have found that a novel class of organic polyalkyleneoxy carbonates are readily synthesized by the ester inter-change between an alkyl- or aryl-polyalkyleneoxy alkanol and a diphenyl carbonate or a substituted diphenyl carbonate at a temperature of from 200° to 230° C. and a pressure of from 5 to 15 mm. for a period of time ranging from 1½ to 3 hours. In this ester inter-change reaction the original carbonate is gradually converted to the new carbonate by removing volatile phenol or volatile substituted phenol from the equilibrium established during the heating. This method provides for high yields of relatively pure diesters of carbonic acid and in addition provides for the reaction to be conducted in a simple distillation apparatus without the need of solvents, filtration, etc., thereby providing an economical method for manufacture. In conducting the reaction 2 moles of either an alkyl- or aryl-polyalkyleneoxy alkanol or a mixture thereof containing 1 mole of the alkyl-polyalkyleneoxy alkanol and 1 mole of an aryl-polyalkyleneoxy alkanol is reacted with 1 mole of diphenyl carbonate or substituted diphenyl carbonate within the said temperature, pressure and time range. During this ester inter-change 2 moles of phenol or substituted phenol resulting from the diphenyl- or substituted diphenyl-carbonate are released and removed from the reaction product by vaporization. The resulting carbonates range from viscous oils to waxy solids, which are particularly adaptable as functional fluids such as, for example, hydraulic fluids, synthetic lubricants, etc., in water-repellant formulations, in cosmetics, as mold-release agents, and in other industrial applications as will be pointed out hereinafter.

The organic polyalkyleneoxy carbonates may also be prepared by conducting the ester inter-change stepwise, i.e. by first reacting one mole of either the alkyl- or aryl-polyalkyleneoxy alkanol. After removal of phenol or substituted phenol, the reaction is completed by the addition of one mole of the same or different alkanol until one mole of phenol or substituted phenol is removed. The reaction conditions are the same as above.

The organic polyalkyleneoxy carbonates prepared in accordance with the present invention are characterized by the following general formula:

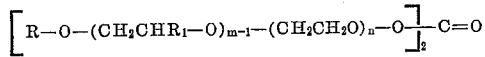

wherein R represents at least one member of the group consisting of either a straight or branched chain alkyl radical containing from 1 to 28 carbon atoms, e.g., methyl, propyl, butyl, octyl, nonyl, decyl, hendecyl, dinonyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, myricyl, etc., alkylene radical, i.e., unsaturated monovalent aliphatic radical, of from 5 to 18 carbon atoms, e.g., pentenyl, hexenyl, heptenyl, octenyl, dodecenyl, octadecenyl, etc., acyl of from 6 to 18 carbon atoms, e.g., caproyl, lauroyl, palmitoyl, oleoyl, stearoyl, etc. and an aryl radical of 6 to 14 carbon atoms, e.g., phenyl, diphenyl, naphthyl, 2- and 5-anthryl, etc. which are unsubstituted or substituted by a mono-, di- or tri- alkyl of from 1 to 18 carbon atoms, e.g. dimethylphenyl, dipropylphenyl, nonylphenyl, dinonylphenyl, octadecylphenyl, tri-octadecylphenyl, etc., $R_1$ represents either hydrogen, methyl, ethyl, phenyl, or cyclohexene oxide and $m$ and $n$ represent a positive integer of from 1 to 150.

The polyalkyleneoxy alkanols from straight or branched chain alkyl alcohols of 1 to 28 carbon atoms and the polyalkylene aryl alcohols and the various alkylates characterized by the formula $R\!-\!O\!-\!(CH_2CHR_1\!-\!O)_m\!-\!H$ wherein R and $R_1$ have the same values as above and $m$ has a value of from 1 to 150, prior to carbonate formation, are prepared by the usual methods of the prior art. Suitable methods for their preparation are described in United States Patents 1,970,578, 2,213,477, 2,575,832, 2,593,112 and 2,676,975, the complete disclosures and teachings of which are incorporated herein by reference thereto. In this connection it is to be noted that the prior art teaches that the straight or branched chain alkyl alcohol or aryl alcohol and various alkylated derivatives thereof may be reacted with a single oxide such as ethylene oxide, propylene oxide, butylene oxide, styrene oxide or vinyl cyclohexene dioxide or mixtures thereof in various proportions to yield surface active agents. Such agents may be employed in accordance with the present invention. When oxides of higher carbon atom content than ethylene oxide or mixtures of ethylene oxide with the higher oxides are used to produce the surface active agents, such agents, before they can be employed in accordance with the present invention, must be chain ended with at least one mole of ethylene oxide prior to the ester inter-change with the di-substituted carbonate compound. The number of moles of ethylene oxide may range from 1 to 150.

As examples of diphenyl- and substituted diphenyl-carbonate compounds, which may be employed in the ester inter-change reaction, the following are illustrative:

diphenyl carbonate
di-o-cresyl carbonate
di-m-cresyl carbonate
di-p-cresyl carbonate
di-2,4-xylenyl carbonate
di-2,4-dichlorophenyl carbonate The following illustrative examples will show how the alkyl- and aryl-polyalkyleneoxy carbonates and mixtures thereof are prepared and how they may be employed in various industrial applications.

EXAMPLE I

Into a 1-liter flask equipped for vacuum distillation there was added a mixture of 53.5 grams (0.25 mole) of diphenyl carbonate and 143 grams (0.5 mole) of nonylphenol ethoxylate containing 1.5 moles of ethylene oxide per unit of nonylphenol and the mixture gradually heated with agitation from ambient temperature to 150° C. under reduced pressure to 10 mm. The temperature was gradually increased at the same pressure to 220° C. for a period of about 2 hours during which the phenol distillate was collected in a trap. There were obtained 45 grams of phenol (theoretical recovery 47 grams) and 149.2 grams of a liquid product which had a varnish color scale (VCS) of 1. Infra-red analysis indicated that the appropriate symmetrical carbonate had been formed by the absence of an OH band and the presence of a strong carbonyl band at 4.71 microns.

The spectrum was consistent with the following structure:

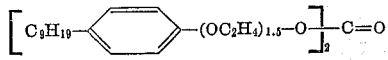

This product was insoluble in water but soluble in light mineral oil.

EXAMPLE II

Example I was repeated using 209 grams (0.35 mole) of oleyl alcohol condensed with 7.5 moles of ethylene oxide and 40 grams (0.187 mole) of diphenyl carbonate. A total of 29.4 grams of phenol (32.8 grams theoretical) distillate and 214.6 grams of liquid residual product were obtained. The product had a VCS=3 and was dispersable in both mineral oil and water. It has the following formula:

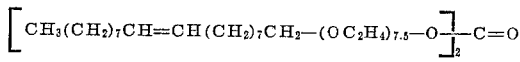

EXAMPLE III

The procedure of Example I was repeated in a 2-liter flask with a mixture of 670.8 grams (0.1 mole) of o-cresol ethoxylated with 150 moles ethylene oxide and 10.7 grams (0.05 mole) of diphenyl carbonate. There were obtained 8.7 grams of phenol representing a yield of 92.5% of a wax-like compound having the following structure:

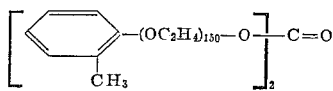

EXAMPLE IV

Operating as in Example I, 492 grams (1 mole) of Alfol 1214 (a $C_{13}$ linear alcohol known to be biodegradable) condensed with five moles of ethylene oxide and one mole of butylene oxide were transesterified with 107 grams (0.5 mole) of diphenyl carbonate. There were obtained 88 grams of phenol indicating that the liquid carbonate had been formed in 93.5% of the theoretical yield.

EXAMPLE V

A mixture of 371 grams (1 mole) of docosanol condensed with one mole of ethylene oxide and 107 grams (0.5 mole) of diphenyl carbonate were heated as described in Example I. The phenol distillate weighed 90 grams representing 95.7% of the theoretical yield of a compound having the following structure:

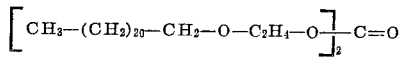

This residual waxy product (274 grams) had a VCS=<1.

EXAMPLE VI

Example I was repeated using 351 grams (0.5 mole) of 2,4,6-tri-tertiary butylphenol condensed with ten moles of ethylene oxide and 53.5 grams (0.25 mole) of diphenyl carbonate. The product had the following structure:

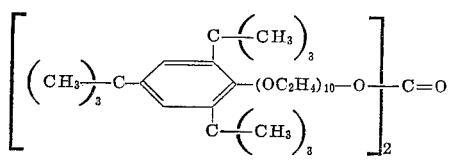

EXAMPLE VII

In a manner similar to Example I while employing a 2-liter flask, 1108 grams (0.25 mole) of methanol condensed with 100 moles of ethylene oxide was reacted with 53.5 grams (0.25 mole) of diphenyl carbonate. After removing 22 grams of phenol by distillation, the reaction mass was cooled to 100° C. and 123 grams (0.25 mole) of p-docosyl phenol condensed with two moles of ethylene oxide was added and the mixture again heated to 225° C. (10 mm.). An additional 21 grams of phenol was obtained and the final wax-like product has the following structure:

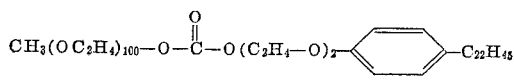

EXAMPLE VIII

A mixture of 207 grams (1.0 mole) of 2,4-dichlorophenoxy ethanol was reacted with 107 grams (0.5 mole) of diphenyl carbonate as described in Example I. The residual white solid product had the following structure:

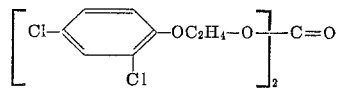

EXAMPLE IX

A mixture of 534 grams (1 mole) of phenol condensed with ten moles of ethylene oxide and 107 grams (0.5 mole) of diphenyl carbonate was heated as described in Example I. A total of 93 grams (99% of theoretical) of phenol was obtained by distillation and the product has the following structure:

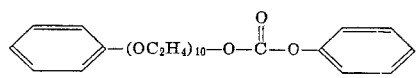

EXAMPLE X

Example I was repeated except that 60.5 grams (0.25 mole) of dicresyl carbonate was substituted for 53.5 grams diphenyl carbonate. A total of 49 grams (90.6% of theoretical) of cresol was obtained by distillation.

EXAMPLE XI

Example I was repeated except that 88 grams (0.25 mole) of 2,4-dichlorophenol carbonate was substituted for 53.5 grams of diphenyl carbonate. The 2,4-dichlorophenol obtained by distillation weighed 36 grams representing 89.5% of the theoretical yield.

EXAMPLE XII

The procedure of Example I was followed using 716 grams (2 moles) of stearyl alcohol condensed with two moles of ethylene oxide and 214 grams (1 mole) of diphenyl carbonate. A total of 185.1 grams of phenol (98.5% of theory) distillate and 925 grams residual product were obtained. The product is a nearly white, waxy solid.

EXAMPLE XIII

Example I was repeated using 458 grams (1 mole) of oleic acid condensed with four moles of ethylene oxide and 107 grams (0.5 mole) of diphenyl carbonate. There were obtained 90 grams of phenol (95.7% of theory) by distillation.

The semi-solid product was identified as the symmetrical carbonate by the presence of strong bands at 5.71, 7.9 and 8.9 microns and the absence of an OH band and aromatic bands.

EXAMPLE XIV

The procedure of Example I was repeated using 546 grams (1 mole) of dodecyl alcohol condensed with three moles of styrene oxide and 107 grams (0.5 mole) of diphenylcarbonate. There were obtained 91.5 grams of phenol (97.4% of theory). The residual product, 560 grams, was a semisolid wax.

EXAMPLE XV

The procedure of Example I was repeated using 102 grams (1 mole) of n-hexylalcohol condensed under acidic conditions with one mole of vinylcyclohexene dioxide, followed by condensation of one mole of triethylene glycol under basic conditions with the residual epoxyethyl group, and 107 grams (0.5 mole) of diphenyl carbonate. The distillation step gave 89.4 grams (95% of theory) of phenol. There remained as product 406 grams of a tan liquid having an infrared spectrum consistent with the following structure:

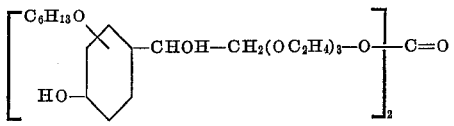

All of the foregoing compounds incorporate not only the desirable functions of the carbonates but also impart surface active properties to oil in water systems. They may be used in the formulation of functional fluids, paints, plastics, greases, lubricants and other petroleum products, catalysts, drugs, textile auxiliaries, and the like. In the formulation of functional fluids they may be used to modify lubricating, viscosity and other rheological properties. They may be used in hydraulic and refrigeration systems. Their mild nature makes them of value in applications such as cosmetics, detergents, polishes, fabric cleaners and other cleaning products for household and industrial uses. They also are applicable in non-aqueous media such as solvent base paints and other protective coatings and the like. They may also be used in textile processing such as in fiber finishes, water repellants, antistatic agents, weighting textile goods, kier boiling, scouring, and other textile applications. They may also be used to improve strength in cotton goods. They may also be used to modify the surface properties of leather, wood, paper and other related materials. Another use is as modifiers in protective coatings, such as paints and enamels. Still another use is in the preparation of catalyst carriers. They may also be used in the manufacture of polymers as intermediates such as crosslinking agents and to improve scratch resistance. They are also useful in biocidal formulations as emulsifiers, in industrial applications such as defoamers, corrosion inhibitors, refractory binders in investment casting, gelling agents, additives to improve adhesion of protective coatings such as lacquers and resins to glass.

We claim:

1. The organic polyalkyleneoxy carbonate having the following formula:

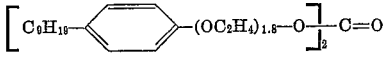

2. The organic polyalkyleneoxy carbonate having the following formula:

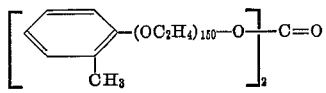

3. The organic polyalkyleneoxy carbonate having the following formula:

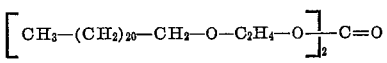

4. The organic polyalkyleneoxy carbonate having the following formula:

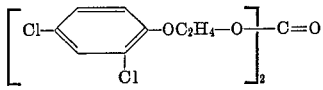

5. The organic polyalkyleneoxy carbonate having the following formula:

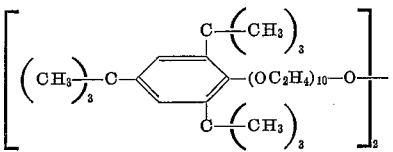

6. The organic polyalkyleneoxy carbonate having the following formula:

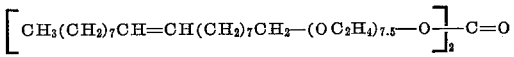

References Cited

UNITED STATES PATENTS

| 2,153,137 | 4/1939 | Dickey et al. | 260—463 X |
| 2,407,446 | 9/1946 | Pollack | 260—463 X |
| 2,651,657 | 9/1953 | Mikeska et al. | 260—463 |

FOREIGN PATENTS 459,311  5/1928  Germany.

OTHER REFERENCES

Drake et al., J. Am. Chem. Soc., vol. 52, pp. 3720–3724 (1930).

CHARLES B. PARKER, *Primary Examiner.*

F. D. HIGEL, *Assistant Examiner.*